United States Patent [19]

Tsuruoka et al.

[11] Patent Number: 4,470,310
[45] Date of Patent: Sep. 11, 1984

[54] KARMAN'S VORTEX FLOW METERING APPARATUS

[75] Inventors: Michihiko Tsuruoka, Sagamihara; Noriomi Miyoshi, Kawasaki, both of Japan

[73] Assignee: Fuji Electric Company, Ltd., Kanagawa, Japan

[21] Appl. No.: 388,670

[22] Filed: Jun. 15, 1982

[30] Foreign Application Priority Data

| Jun. 15, 1981 | [JP] | Japan | 56-90813 |
| Jun. 15, 1981 | [JP] | Japan | 56-90814 |
| Jun. 15, 1981 | [JP] | Japan | 56-86713 |
| Jun. 15, 1981 | [JP] | Japan | 56-90815 |

[51] Int. Cl.$^3$ ............................................. G01F 1/32
[52] U.S. Cl. .................................................. 73/861.24
[58] Field of Search ............ 73/861.22, 861.24, 861.21

[56] References Cited

U.S. PATENT DOCUMENTS

| 2,453,376 | 11/1948 | Lagasse | 73/861.21 |
| 3,722,273 | 3/1973 | Yamasaki et al. | 73/861.22 |
| 3,796,095 | 3/1974 | Fussell, Jr. | 73/861.24 |
| 4,161,878 | 7/1979 | Fussell, Jr. | 73/861.24 |
| 4,206,642 | 6/1980 | Bearcroft | 73/861.24 |

FOREIGN PATENT DOCUMENTS 2458901 6/1975 Fed. Rep. of Germany ... 73/861.22

OTHER PUBLICATIONS

Yamasaki et al., "The Karman Vortex Flowmeter" in J. Soc. Inst. Cont. Eng.. (Japan), vol. 10, No. 3, 3/71, pp. 173-188.

Primary Examiner—Herbert Goldstein
Attorney, Agent, or Firm—Brumbaugh, Graves, Donohue & Raymond

[57] ABSTRACT

In the particular embodiments of the invention described herein, a Karman's vortex flow metering apparatus has an oscillating plate magnetically held at the vertex of a triangular chamber located outside a flow line. Within the flow line a Karman's vortex generator is mounted transverse to the flow direction and has vortex generating slits extending along its length. Pressure detecting slits located at the end of the generator near the detector communicate through short pressure transmitting lines with opposite sides of the chamber. The resulting oscillation of the plate is detected optically or magnetically to provide signals corresponding to the flow rate.

5 Claims, 20 Drawing Figures

KARMAN'S VORTEX FLOW METERING APPARATUS

BACKGROUND OF THE INVENTION

The present invention relates to a flow metering apparatus utilizing Karman's vortexes.

A flow metering apparatus to measure the speed of current or the quantity of flow of a fluid by detecting the frequency of Karman vortexes generated downstream of an object inserted in a current has been well known for a long time. In contrast to a liquid, where the coefficient of viscosity prevails, in the case of gas the density prevails and, consequently, the generated vortex is weak. Hence a high sensitivity sensor must be provided for detection of gas vortexes, particularly in a low current zone. However, a method using a thermal element such as a high sensitivity heat detector, or thermistor, and an ultrasonic wave, requires a very small analog signal to be amplified electrically, and the temperature characteristic or stability of the sensor and detection circuit exerts a large influence on the measuring precision and range. In particular, for this type of application, an apparatus is required which is less influenced by the sensor characteristics, has a simple circuit configuration and is high in sensitivity.

An apparatus such as described in Japanese Utility Model Publication No. 46-21501, for example, is an improvement over conventional apparatuses since it facilitates signal processing by displacing an oscillating plate in accordance with vortex pressure. The apparatus comprises a chamber with a vortex generator and an oscillator consisting of a plate material mounted with one end fixed on a wall of the chamber. That apparatus operates to obtain the speed of current or quantity of flow of a fluid from the displacement frequency of the oscillator. This type of apparatus is advantageous in providing a simplified structure for detecting a change in pressure due to generation of vortexes directly as displacement or force. Nevertheless, since the change in pressure due to generation of vortexes has a characteristic which is approximately proportional to the square of the speed of current or quantity of flow, it is too small at low flow rates to accomplish displacement of an oscillating plate or diaphragm. Moreover, since the conventional apparatus has the oscillator fixed at one end, a rigid material such as metal is not capable of detecting vortexes at a low flow rate and a soft material such as plastic does not function to maintain a central position, causing it to stick peripherally due to static electricity, and the displacement becomes excessive at a high rate, shortening the life of the apparatus.

In addition, the oscillator oscillates in the chamber during pressure intakes, permitting large pressure leaks, and thus detection of the change in vortex pressures is not effective. Further, the fluid flows in accordance with displacement of the oscillator so that a secondary oscillation is produced by the flowing fluid, unavoidably producing noise.

The first object of the invention is to provide a vortex detecting unit which is free of the above-mentioned defects by improving the supporting mechanism for an oscillator, providing superior sensitivity at low current levels and using a simple detection circuit.

Another object of the invention is to provide a Karman's vortex flow metering apparatus which is free of the above-mentioned defects by providing a construction wherein a change in vortex pressure will effectively actuate the oscillator, which minimizes leakage between pressure intakes, which is superior in sensitivity at low current levels and is simple in structure.

SUMMARY OF THE INVENTION

These and other objects are attained by providing a plate member which is made of magnetic material and is displaced according to a pressure fluctuation arising near both sides of a columnar Karman's vortex generator mounted perpindicularly in the flow of a fluid, and in which one end of the plate member is held magnetically to a support.

In addition, a chamber having the shape of an isosceles triangle in section with a supporting point for the oscillatory plate member at the vertex is provided in the vortex detecting unit. The plate member is oscillated by the pressure from vortexes generated from the Karman's vortex generator. Pressure transmitting holes to transmit the pressures of the vortexes are provided in the isosceles chamber wall surfaces, and each of the pressure transmitting holes is covered when the plate member is moved in the chamber so as to come in contact with the corresponding wall surface.

The current/flow measuring device as described in Japanese Patent Publication No. 52-25346 is known as a Karman's vortex flow metering apparatus which is arranged to transmit a pressure fluctuation arising from the generation of vortexes in a fluid flow measuring line. Pressure variations produced by the vortexes are transmitted through a pressure extraction pipe to a thermal element provided outside the line to detect the frequency of the vortexes. However, in such measuring devices, the pressure transmitting hole through which the pressures produced by the vortexes are transmitted is generally near the center of the fluid flow measuring line because of the current distribution in the measuring line. Therefore, if the pressure detecting unit is installed externally of the measuring line, the distance from the pressure transmitting hole to the pressure detecting unit becomes long (the length increasing as the diameter of the measuring line increases), and thus the pressure generated by vortexes is attenuated, causing difficulty in detection.

Accordingly, it is another object of the invention to provide a Karman's vortex flow metering apparatus capable of detecting a pressure fluctuation stably by transmitting the pressure fluctuation resulting from generation of vortexes to the pressure detecting unit in an effective manner without attenuation.

This object can be attained, according to the invention, by a construction having a first slit open at both sides along the entire length of the vortex generator and opening substantially orthogonally to the flow of fluid in the line to generate Karman's vortexes, and another slit on each side of the generator, downstream from the first slit, for transmitting pressure through a pressure-transmitting hole to a pressure detecting unit mounted outside the measuring line.

A flow metering apparatus used for automobile engines is generally exposed to an influence of the engine room temperature or electrical noise. To avoid the influence of temperature, a method to cool down an electric circuit for vortex detection in a flow metering apparatus with suction air is employed hitherto, as disclosed, for example, in Japanese Utility Model Laid-Open No. 55-28998. According to that method, the desired cooling effect is not obtained when the engine is idling because the quantity of suction air is low. This can cause a temperature increase great enough to destroy the reliability of the electric circuit, and the cost of compensating for the temperature increase is inevitably high. It might then be proposed that the electric circuit portion of the vortex detector should be installed in a location having more favorable temperature conditions than the engine room. In that case, however, a small detected electric signal is subject to the influence of electrical noise from the ignition system while it is transmitted through the electric circuit, which can spoil the measurement.

To overcome this problem, it is still another object of the invention to provide a Karman's vortex flow metering apparatus capable of measuring the flow rate of air to an engine with high precision and reduced interference from temperature and electrical noise.

This object can be attained, according to the invention by a construction wherein a flow metering apparatus has an oscillating member displaced by the pressure of Karman's vortexes generated according to the automobile engine air flow and an optical displacement detecting means is mounted in the engine compartment to detect the displacement of the oscillating member optically. An electric circuit to detect the quantity of suction air, mounted outside the engine room, is arranged to convert a light signal from the optical displacement detecting means into an electric signal and the electric circuit means and the flow metering apparatus are coupled through a light transmitting means.

BRIEF DESCRIPTION OF THE DRAWINGS

The preferred embodiments of the invention will now be described with reference to the accompanying drawings, in which.

DESCRIPTION OF PREFERRED EMBODIMENTS

Figure 1:
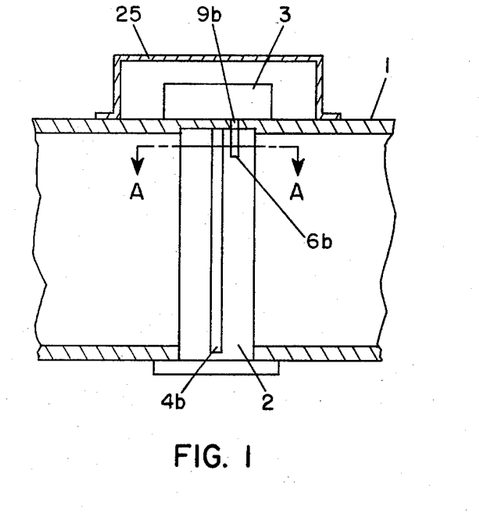
FIG. 1 is a side view, partly in section, showing a flow metering apparatus according to the invention.
Figure 2:
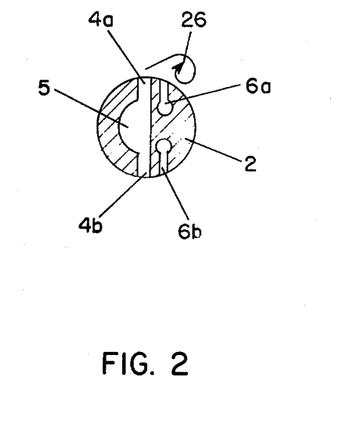
FIG. 2 is a sectional view taken on the line A—A of FIG. 1 and looking in the direction of the arrows, showing a vortex generator.

In the representative embodiment shown in FIGS. 1-4, a flow line 1 for a gaseous medium has a vortex generator 2, for generating Karman's vortexes extending across the flow line, and a vortex detecting unit 3 is mounted at one end of the vortex generator. As best seen in FIG. 2, two slits 4a and 4b extend along the opposite sides of the vortex generator 2, orthogonal to the flow in the line 1, to generate stable vortexes. The slits 4a and 4b are connected to a chamber 5 and two further slits 6a and 6b are provided on the downstream of the slits 4a and 4b on opposite sides of the vortex generator near the detector 3 to supply the pressures generated by the vortexes.

Figure 3A:
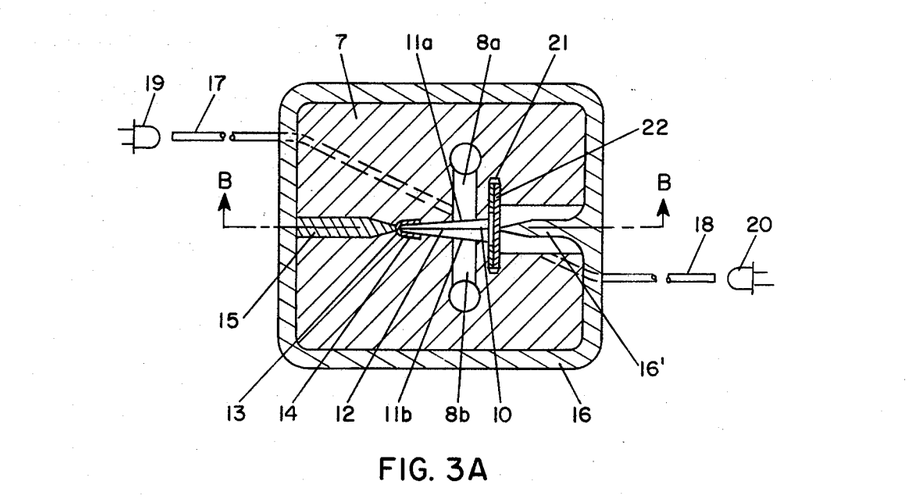
FIG. 3A is a sectional plan view of a vortex detecting unit.
Figure 3B:
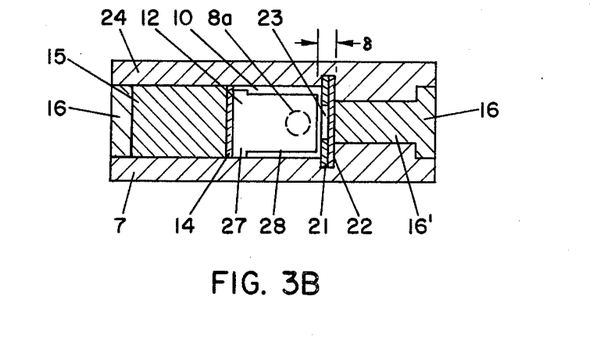
FIG. 3B is a sectional view taken on the line B—B of FIG. 3A and looking in the direction of the arrows.
Figure 4:
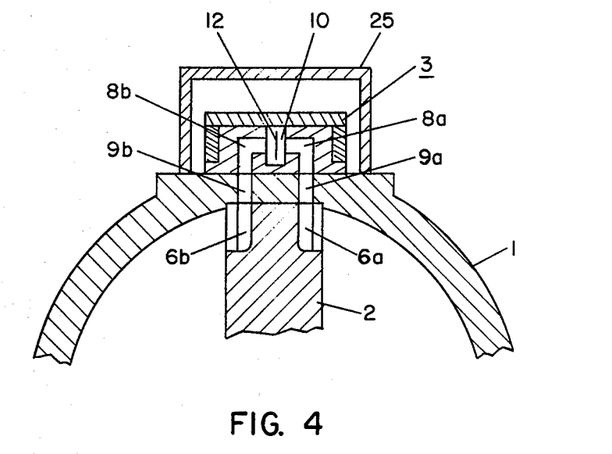
FIG. 4 is a fragmentary sectional view showing a portion of the vortex generator of FIGS. 1 and 2.

As shown in FIGS. 3A and 3B, the vortex detector comprises a housing 7 made of a nonmagnetic material like aluminum, for example, and two pressure lead holes 8a and 8b are connected to the second slits 6a and 6b of the generator 2 by way of two holes 9a and 9b, shown in FIG. 4, which pass through the wall of the line 1. A substantially triangular chamber 10 is provided between the two pressure lead holes, and the pressure lead holes 8a and 8b are provided in wall surfaces 11a and 11b of the chamber, respectively.

A thin oscillating plate 12, having a thickness of about 20μ and made of a magnetic material like iron or nickel, is mounted in the oscillating chamber 10 with one end 13 held against a bearing member 14 retained in position thereon by a permanent magnet 15, with its remaining peripheral edge left free to permit oscillation. The construction is such that, when the oscillating plate 12 is displaced, it engages one of the wall surfaces 11a and 11b and covers the corresponding pressure lead hole 8a or 8b in that wall surface. The bearing 14 is made of a thin nonmagnetic metallic material, like a beryllium copper plate 0.1 mm or so in thickness, and provides a supporting line for the oscillating plate 12 and also grounds the oscillating plate. A yoke 16, surrounding the housing 7, is connected at one end of the magnet 15 and a projection 16' is provided on the yoke at a position opposite to the end of the magnet 15, thus forming a magnetic path passing through a gap δ, the oscillating plate 12 and the bearing 14. The projection 16' is positioned at the center of the chamber 10, concentrating the magnetic flux from the magnet 15 so that it normally holds the oscillating plate 12 at the center of the chamber 10. The oscillating plate 12 can thus be oscillated with an extremely small spring constant.

A pair of optical fibers 17 and 19 is mounted with ends disposed coaxially and on opposite sides of the oscillating plate 12. The other ends of the fibers are provided with a light emitting element 19 and a light receiving element 20, respectively so as to detect oscillation of the plate 12. A thin nonmagnetic metallic plate 21 having a hole 23 to transmit light is backed by a seal member 22 made of a transparent resin to keep the chamber 10 airtight. A cover 24 completes the enclosure for the chamber 10. Finally, an enclosure 25, shown in FIGS. 1 and 4, protects the vortex detecting unit 3 from external magnetic field influences.

The operation of the embodiment of FIGS. 1-4 is as follows. When a vortex 26 (FIG. 2) is generated outside the vortex generator 2, the pressure in the slit 6a is reduced below that in the slit 6b on the opposite side. Consequently a pressure difference arises between opposite sides of the oscillating plate 12 in the chamber 10. The oscillating plate 12 is therefore displaced toward the lower pressure lead hole 8a and comes into contact with the wall surface 11a.

Since the wall surfaces 11a and 11b are substantially in line with the supporting point for the oscillating plate 12, a fluid layer between the oscillating plate 12 and the wall surface 11a functions as a damper or shock absorbing member. With this arrangement, moreover, the oscillating plate 12 closes the pressure lead hole 8a in the wall surface 11a securely to keep the gaseous fluid from flowing between the pressure transmitting openings 8a and 8b. Consequently, the plate 12 is securely held against the wall surface 11a by the vortex pressure. In other words, the oscillating plate 12 approaches the wall surface 11a smoothly, and then a secure retaining force is produced. Therefore, no repercussion will take place at the time of contact. The damping action of the fluid layer also effectively prevents any external oscillation which might be transmitted by the detector, thus improving the signal to noise ratio.

In the above-described embodiment, the chamber 10 is made triangular in section (i.e., substantially in the shape of an isosceles triangle as will be apparent from the drawing). However, any shape is acceptable as long as the shape is effective to provide a vortex pressure which acts on the oscillating plate 12 effectively to minimize any circulation of the fluid between the pressure transmitting holes 8a and 8b.

When the vortex is next generated on the opposite side, the oscillating plate 12 is drawn by the magnetic force of the projection 16' of the yoke 16 to the opposite side and then engages the wall surface 11b. As a result of the successive generation of a pair of vortexes, the oscillating plate 12 oscillates with a constant amplitude of movement between the wall surfaces 11a and 11b. Further, during the displacement of the oscillating plate, the fluid leaks through a clearance between a peripheral edge of the oscillating plate 12 and the inside of the chamber 10. However, because the clearance is kept extremely small and, as mentioned hereinabove, the opening of the pressure lead holes 8a, 8b is kept smaller than the size of the oscillating plate 12 to prevent the fluid from escaping directly, the leakage is minimized, and thus the vortex pressure acts on the oscillating plate 12 without loss.

Further, the oscillating plate 12 is retained magnetically by the magnet 15 and the yoke 16. Therefore, the spring constant of the plate 12 can be minimized as compared with a plate having one end fixed. The oscillating plate 12 is also retained in position magnetically by the projection 16'. Consequently, the oscillating plate 12 comes in physical contact with the bottom 28 of the chamber 10 only through a projection 27 near the supporting point. The amount of friction is thus kept small so that a large displacement is obtainable by a minute differential pressure. The detection sensitivity at a low current flow is therefore improved, and a movement of constant amplitude is obtainable over a large measurement range. Another advantage of holding the oscillating plate by a magnet is that a material of high rigidity can be used for the oscillating plate without regard to its spring constant.

In order to oscillate the plate 12 reliably over an extensive frequency range of 20 Hz to about 1 KHz, it is essential to apply a change in the vortex pressure directly on the oscillating plate by providing a natural frequency of the fluid system, comprising the chamber 10, the pressure transmitting holes 8a and 8b, etc., having a value higher than that of the vortex frequency. As mentioned above, the second slits 6a and 6b are formed at the axial end of the vortex generator 2 and the pressure transmitting holes 8a and 8b are connected to them at the shortest possible distance. As a result, a higher natural frequency of the fluid system is obtainable, thus permitting detection of the vortexes in a stable manner.

The frequency of oscillation of the oscillating plate 12 is detected, for example, by causing the plate to interrupt a light path extending diagonally with respect to the oscillating plate. As shown in FIG. 3A, the light is interrupted when the oscillating plate 12 is positioned against the wall surface 11a but is transmitted when the plate is positioned against the opposite wall surface 11b. Therefore, one light pulse is obtained for each reciprocation of the oscillating plate 12, thereby indicating the vortex frequency. Since a constant amplitude signal may be used to detect displacement of the oscillating plate by transmitting or interrupting the light in which the signal amplitude is not dependent on the vortex frequency, signal processing is facilitated. Although the optical path extends diagonally to the oscillating plate in the embodiment illustrated in FIG. 3A, other optical paths may be provided.

Figure 5A:
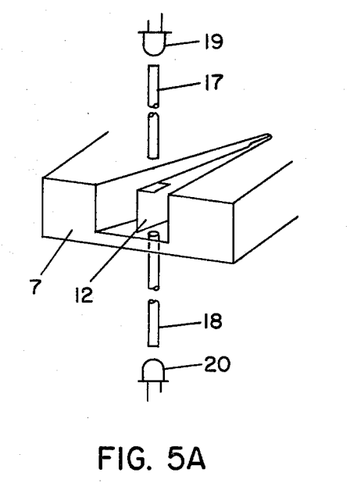
FIGS. 5A and 5B are perspective diagrammatic views illustrating a variant of an optical displacement detecting unit.
Figure 5B:
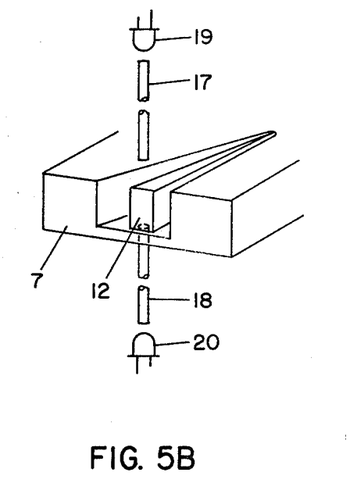

In this respect, FIGS. 5A and 5B illustrate different arrangements for an optical detecting means. As will be apparent from those illustrations, FIG. 5A shows an arrangement in which the oscillating plate 12 has a bent portion to intercept an optical path which is disposed parallel to the plane of the oscillating plate 12 while FIG. 5B shows an oscillating plate 12 which is thickened to intercept the same optical path.

Figure 6A:
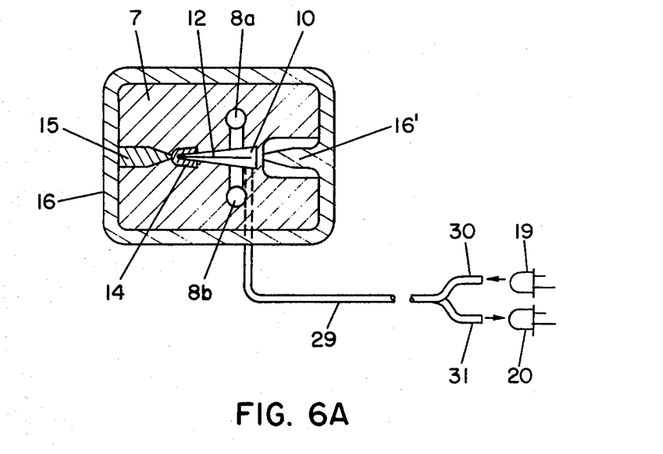
FIG. 6A is a sectional schematic view illustrating another embodiment of the optical displacement detecting unit.
Figure 6B:
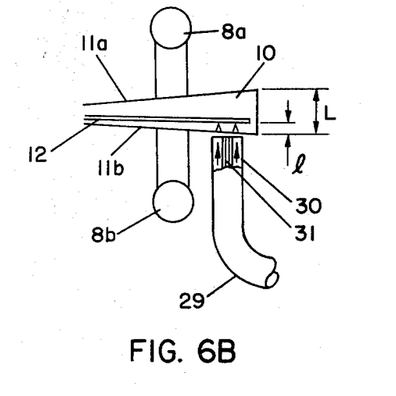
FIG. 6B is a fragmentary enlarged view showing the unit of FIG. 6A.
Figure 6C:
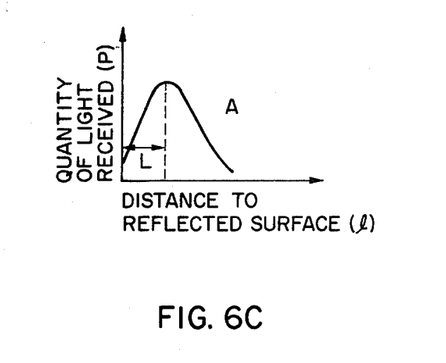
FIG. 6C is a graphical representation showing a characteristic of a sensor.

FIGS. 6A-6C illustrate still another optical arrangement for detecting displacement of the oscillating plate, using a reflected light detector for detecting light reflected by the oscillating plate when it is displaced. As in the case of the embodiment of FIGS. 1-4, the detecting unit has pressure transmitting holes 8a and 8b to transmit the vortex pressure, the chamber 10 is connected to the pressure transmitting holes 8a and 8b, the oscillating plate 12 is mounted in the oscillating chamber 10, and the magnet 15 with its yoke 16 holds the oscillating plate 12 in position. In this case an optical fiber 29, having two internal optical paths 30 and 31, is positioned to detect displacement of the oscillating plate 12. The optical fiber 29 passes through a wall of the chamber 10 and has one end disposed opposite one side of the oscillating plate 12 and the other and is mounted adjacent to a light emitting element 19 and to a light receiving element 20.

With this arrangement, light transmitted through the optical path 30 may be reflected from the surface of the oscillating plate 12 into the optical path 31 as shown in FIG. 6B. The reflected light is not incident on the path 31 when the oscillating plate 12 is against the wall surface 11b but is incident on that path when the plate 12 is against the surface 11a. Therefore, a light signal is obtained for each reciprocation of the oscillating plate 12 and thus the vortex frequency can be detected. As shown by the curve in FIG. 6, the quantity of light P incident on a reflection detector varies according to a distance l to the reflecting surface. Therefore the distance l should be selected so as to have a maximum displacement distance L in the region of continuous increase of received light. This method results in a simplified structure because only one optical fiber is required and a shift in the optical axis does not have any effect on the measurement. Moreover, there is no interference between the fluid passage and the magnetic path.

Figure 7A:
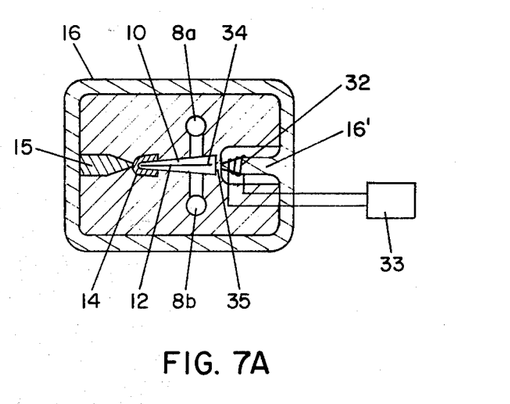
FIGS. 7A is a sectional view illustrating a further embodiment of the displacement detecting unit.
Figure 7B:
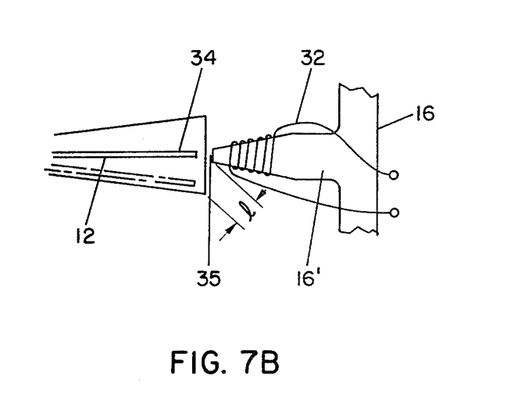
FIGS. 7B is a fragmentary enlarged view showing the unit of FIG. 7A.

FIGS. 7A and 7B show a further embodiment of the arrangement for detecting displacement of the oscillating plate. In this case, a change in magnetic flux of the magnetic circuit is detected as a means to detect displacement of the oscillating plate. As in the case of the other embodiments, the detecting unit has the pressure transmitting holes 8a and 8b to transmit the vortex pressure, the chamber 10 is connected to said pressure transmitting holes 8a and 8b, the oscillating plate 12 is supported at one end in the chamber 10 by the magnet 15 and the yoke 16, with its remaining peripheral edge left free. To detect plate oscillation, a coil 32 is wound on the projection 16' of the yoke 16, and an electronic circuit 33 amplifies and shapes the output signal from the coil.

In the embodiment of FIGS. 7A and 7B, when the oscillating plate 12 is oscillated, the distance l between the tip of the oscillating plate 12 and the projection 16' of the yoke 16 changes, causing the magnetic flux passing through the projection 16' to change. This magnetic flux change occurs twice for each reciprocation of the oscillating plate 12. Consequently, the vortex frequencies can be determined by detecting the induced electromotive force generated in the coil 32. Since this arrangement detects a change in magnetic flux of the magnetic circuit used to retain the oscillating plate, a separate plate displacement detector is not necessary. This provides a simpler structure with a corresponding decrease in cost. Further, the signal provides an output having an amplitude proportional to the vortex frequency but, because only the change in the direction of electromotive force must be detected, no errors will result from a change in the characteristics of the detector and processing circuit. Furthermore, the detector does not come in contact with the fluid in the line and is thus free from contamination which might affect its operation. Although a coil is used in the embodiment shown in FIGS. 7A and 7B, any other element for reliably detecting a change in flux, such as a magnetic reluctance element or the like, can be used.

In accordance with the invention as described above, the oscillating plate displaced by the vortex pressure is not retained by having one end fixed, as in the case of a conventional apparatus, but by having one end held by a magnet. This is accomplished by using a plate of magnetic material disposed between a magnet and an opposed yoke projection. Therefore a small spring constant can be obtained which is not dependent on the rigidity of the oscillating plate and the detection sensitivity can be improved. Further, the plate has no portion where stress is concentrated, as with a fixed part. Therefore the life of the plate is prolonged. Also, the device for detecting displacement of the oscillating plate may comprise an optical path extending diagonally with respect to the surface of the oscillating plate and a pair of light emitting/receiving elements provided at both ends of the optical path, thereby interrupting the optical path according to a displacement of the oscillating plate. The device for detecting displacement of the oscillating plate may also have two optical paths with ends opened substantially orthogonally to the oscillating plate and a pair of light emitting/receiving elements provided on the other ends, thereby detecting changes in the quantity of light reflected from the oscillating surface according to the displacement of the oscillating plate. This structure can be very simple and an electrical signal of constant amplitude is directly obtainable. Furthermore, a change in magnetic flux according to a displacement of the oscillating plate can be detected by providing a device for detecting the change in magnetic flux in the magnetic circuit used to retain the oscillating plate as a means to detect the displacement of the oscillating plate. Such a detector does not come directly into contact with the fluid being detected, which avoids contamination of the detector and also simplifies the construction.

According to another aspect of the invention, an isosceles triangular chamber with the supporting line for the oscillating plate at the vertex of the triangle is provided and pressure transmitting holes to transmit the vortex pressure are provided in the wall surfaces to control the displacement of the oscillating plate with respect to the chamber wall surfaces, the pressure transmitting holes being blocked by contact with the oscillating plate. With this arrangement, the vortex pressure can be utilized effectively while minimizing circulation of the fluid. Consequently, a stable oscillation free from any influence of the strength of vortexes or secondary noise can be obtained, and thus the construction of the detection circuit can be substantially simplified.

Further, according to the invention, the second slits for transmitting the vortex pressure are provided on both sides of the vortex generator. The vortex pressure can thus be transmitted to a vortex detecting unit outside the line, and the pressure transmitting paths can be shortened.

As described previously with reference to FIGS. 1-4, for stable oscillation of the oscillating plate 12 in an extensive frequency range covering 20 Hz~1 KHz, for example, a fluid system comprising the chamber 10 and the pressure transmitting holes 8a and 8b must have a high natural frequency to allow a change in vortex pressure to be applied directly to the oscillating plate 12. This can be accomplished by shortening the line transmitting fluctuations of the vortex pressure through the pressure transmitting holes 8a and 8b, the holes 9a and 9b and the slits 6a and 6b into the chamber 10, or by keeping the natural frequency of the fluid system comprising the pressure transmitting holes and slits high.

Figure 8A:
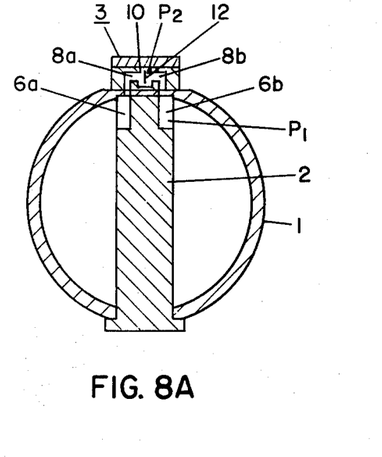
FIGS. 8A and 8B are cross-sectional views showing different vortex generators.
Figure 8B:
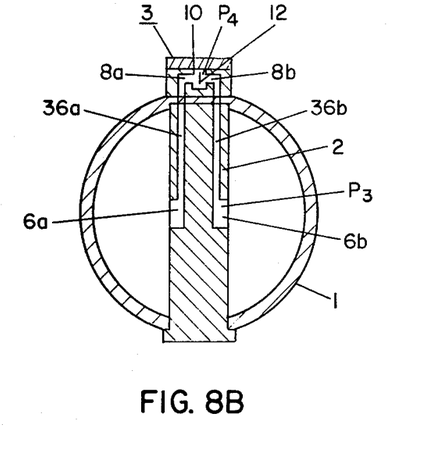
Figure 8C:
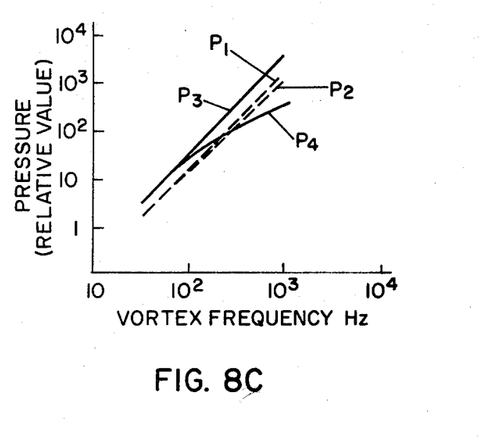
FIGS. 8C and 8D are graphical representations showing certain characteristics of vortex generators.
Figure 8D:
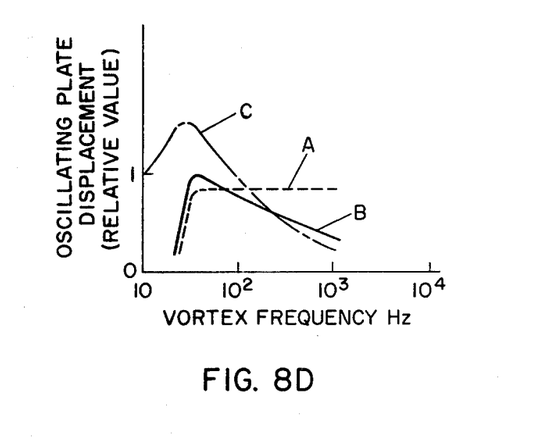

This effect will now be described with reference to FIGS. 8A–8D. FIGS. 8A and 8B are cross-sectional views and FIGS. 8C and 8D are graphical representations which illustrate this by comparing the case wherein the line to transmit fluctuations of pressure generated by vortexes into the chamber is shortened, according to the invention, with the case wherein the pressure-transmitting line is comparatively long, as in prior devices. FIG. 8A illustrates the case where the line is short and FIG. 8B illustrates the case where the line is comparatively long. FIG. 8C shows the relation between the vortex frequency and pressure in the slit and the chamber and FIG. 8D shows the relation between vortex frequency and oscillating plate displacement. The reference symbols used in FIGS. 8A and 8B are the same as those of FIGS. 1-7, and the same references will apply to the construction and function of those embodiments. Accordingly, no further description will be given here. However, FIGS. 8B also shows two pressure transmitting pipes 36a and 36b and the references $P_1$-$P_4$ denote pressures at the slits and in the chamber.

The vortex pressure fluctuates strongly at the center of the fluid flow line adjacent to the vortex generator 2. With a construction of the type shown in FIG. 8B, however, because the pressure transmitting pipes 36a and 36b are so long, the fluctuation of the vortex pressure is attenuated to a greater extent at higher frequencies, as shown in FIG. 8C, and thus a force strong enough to displace the oscillating plate may not be transmitted to the plate. On the other hand, with the arrangement shown in FIG. 8A, although the pressure fluctuation is smaller at the upper end of the vortex generator (the pressure $P_1$ being smaller than the pressure $P_3$ in FIG. 8C), the oscillating plate can be displaced completely because the pressure transmitting pipe is short and the vortex pressure fluctuation thus is fully effective on the oscillating plate 12 without significant attenuation (the pressure $P_2$ being larger than the pressure $P_4$ at higher frequencies).

The frequency of the oscillating plate 12 coincides with the lowest frequency of the vortex which generates a resonance frequency based on the mass of the plate and the attractive force of the magnetic circuit. In other words the frequency response of the plate 12 when a given external force is applied decreases in almost inverse proportion to the square of the vortex frequency, as shown in curve B or C of FIG. 8D. However, because the fluctuation of the vortex pressure applied to the oscillating plate is greater in the case of FIG. 8B, as described above, in proportion to the square of the vortex frequency, the displacement of the oscillating plate therefore becomes constant regardless of the vortex frequency, as shown in the dotted line A of FIG. 8D. If the pressure transmitting pipes 36a and 36b are too long, the fluctuation of the vortex pressure attentuates as mentioned above, and thus the displacement of the oscillating plate 12 deteriorates in inverse proportion to the square of the vortex frequency, thus resulting in no vortex detection.

According to the invention, the construction is such that the second slits 6a and 6b are provided on the end of the vortex generator 2 adjacent to the detector, and the pressure transmitting holes 8a and 8b are connected thereto at the shortest possible distance. Therefore, the fluctuation of the vortex pressure is applied to the oscillating plate at a constant deflection amplitude which is not dependent on the vortex frequency. As a result, the vortex frequency can be detected easily by the plate and the structure of the vortex generator is simplified at the same time to improve the detecting operation.

Furthermore, when the resonant frequency of the oscillating plate is made coincident with the lowest frequency of the vortex to be generated, the sensitivity at low flow rates is improved regardless of the spring constant of the oscillating plate itself.

Figure 9:
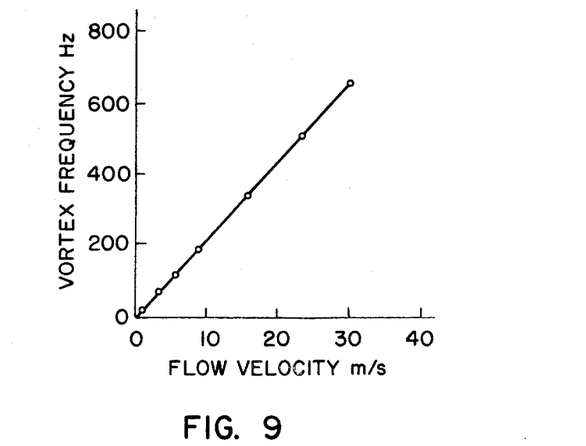
FIG. 9 is a graphical representation showing the relation between flow velocity and vortex frequency in a vortex flow metering apparatus according to the invention.

FIG. 9 illustrates the relation between the vortex frequency and flow velocity and, as will be apparent from the graph, there is a linear relation between the flow velocity and the vortex frequency, and therefore the flow velocity may be determined with high precision.

As described above, the second slits to transmit the vortex pressure are provided on both sides of the vortex generator adjacent to the detector, and the pressure transmitting holes of the vortex detecting unit can be connected to the slits at the shortest possible distance. Therefore, the natural frequency of the fluid system constituted of the pressure transmitting holes, chamber etc. can be increased, and thus a high vortex frequency can be transmitted to the vortex detecting unit installed outside the measuring line without attenuation. Consequently, the detecting precision is improved and a practical application can be obtained despite variations in dimensions of the vortex generator.

Figure 10:
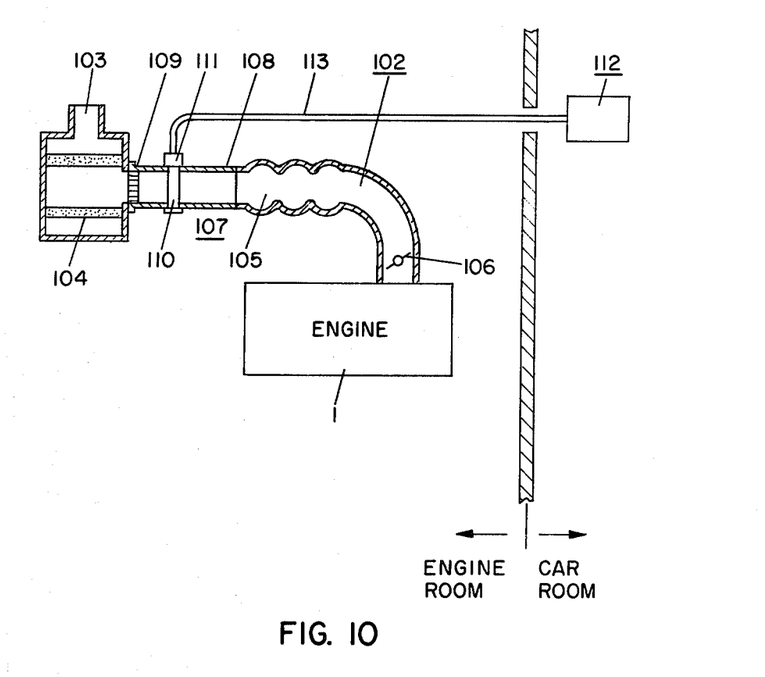
FIG. 10 is a schematic, view partly in section, illustrating an embodiment of the invention adapted for use with an automobile engine.
Figure 11:
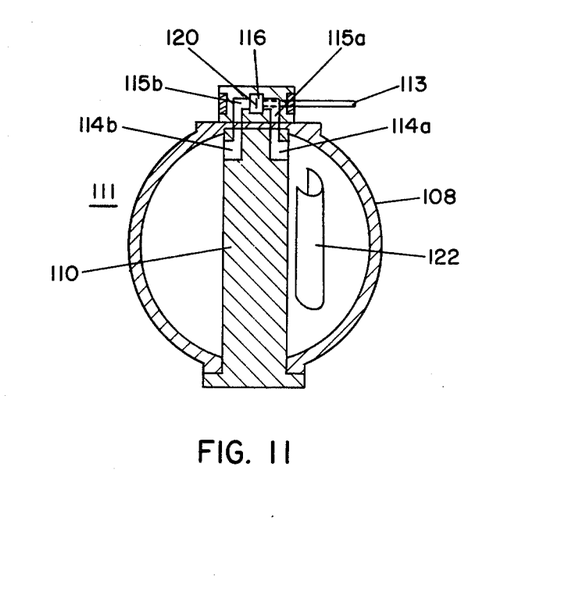
FIG. 11 is a cross-sectional view showing the flow metering apparatus of the embodiment shown in FIG. 10.
Figure 12:
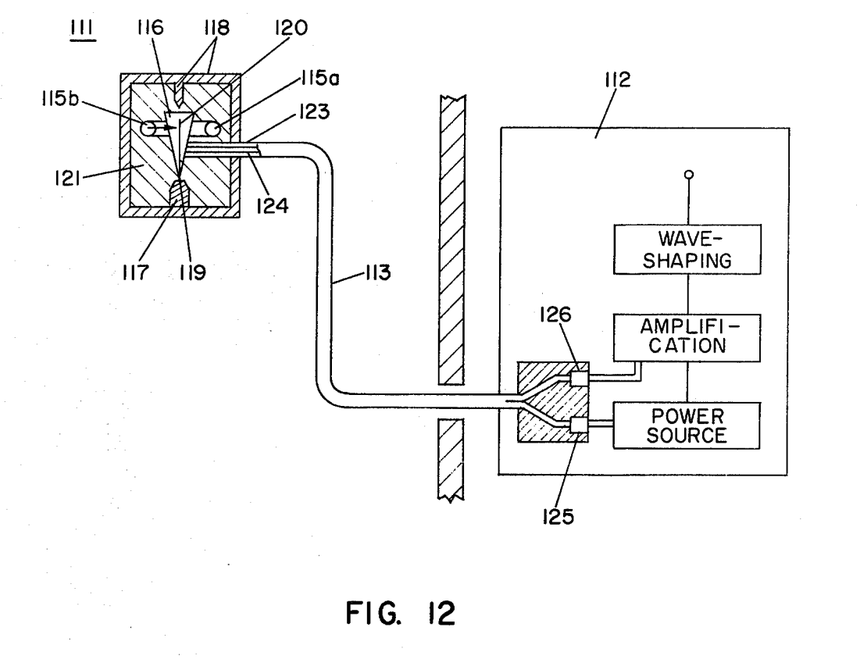
FIG. 12 is a schematic view, partly in section, showing a mechanism for vortex detection in the embodiment of FIGS. 10 and 11.

Finally, an embodiment of the invention for use as a flow metering apparatus in automobile engines is illustrated in FIGS. 10-12. FIG. 10 is a schematic sectional view representing an arrangement wherein a flow metering apparatus according to the invention is mounted on a car. FIG. 11 is a cross-sectional view of the flow metering apparatus, and FIG. 12 is a schematic sectional view illustrating the operation of the vortex detecting mechanism.

In FIGS. 10-12, an engine 101 has a suction air passage 102 which includes an air cleaner 103, a filter element 104, a suction pipe 105 and a throttle valve 106. In accordance with the invention a vortex flow metering apparatus is mounted in the suction air passage 102, which includes a line 108 forming a part of the suction pipe 105, a grate 109 to stabilize the flow in the line 108, a vortex generator 110 inserted in the line to generate vortexes, and a vortex detecting mechanism 111 which converts a change in generated vortex pressure into a light signal and produces a light pulse corresponding to the vortex frequency, all those components being installed in the engine compartment.

An electric circuit 112 converts the light signal from the vortex detecting mechanism 111 into an electrical signal. The circuit 112 is installed within the car to provide a favorable environment with less interference from temperature, electrical noise, etc. as compared with the engine room and is connected with the vortex detecting mechanism 111 of the vortex flow metering apparatus 107 in the engine room by way of an optical fiber 113. The vortex detecting mechanism 111 has openings 114a and 114b provided on opposite sides of the vortex generator 110 which are orthogonal to the flow direction, pressure transmitting holes 115a and 115b connected through to the openings 114a and 114b, respectively, to detect changes in the vortex pressure, a chamber 116 connected to the pressure transmitting transmitting holes 115a and 115b, and an oscillating plate 120 having one end held against a point 119 in the chamber by a magnet 117 and the other end positioned megnetically by a yoke 118, which is made of a magnetic material. These components are enclosed in a housing 121.

In the above construction, when a vortex 122 (FIG. 11) is generated on the side of the vortex generator 110, adjacent the opening 114a, a change in the vortex pressure acts on the oscillating plate 120 through the opening 114a and the pressure transmitting hole 115a, displacing the oscillating plate in the direction indicated by arrow in FIG. 12. When a vortex is generated on the opposite side of the vortex generator 110, the oscillating plate 120 is displaced to the opposite side of the chamber 116. Thus, the oscillating plate 120 reciprocates once in the chamber 116 in response to the generation of a pair of vortexes.

An optical fiber 113, positioned to detect a displacement of the oscillating plate, has two coaxial paths 123 and 124. The optical fiber 113 has one end open to the chamber 116 almost perpendicularly to the adjacent surface of the oscillating plate 120 of said detecting mechanism 111. The other end of the fiber 113 is coupled to a light emitting element 125 and to a light receiving element 126, provided in the detection circuit 112 in the car, through the optical paths 123 and 124 respectively. Therefore, when the oscillating plate 120 is oscillated, the amount of light reflected from the oscillating surface changes in accordance with the change of gap between the oscillating plate 120 the adjacent end of the optical fiber 113, thus producing a light pulse corresponding to each reciprocation of the oscillating plate 120. One electric pulse is therefore obtained corresponding to each pair of vortexes by the photoelectric response of the light receiving element 126 to the light signal, thereby providing an electrical indication of the vortexes.

The vortex detecting method is not necessarily limited to the illustrated embodiments, and any method may be used as long as it provides a displacement in response to a change in vortex pressure. Further, the displacement detecting method is also not limited to the described embodiments and an optical path can be interrupted or opened in any manner by the oscillating plate.

As described above, according to the invention, a construction is provided so that the oscillating plate is displaced by changes in the vortex pressure and, by detecting a displacement of the oscillating plate optically, a change in the vortex pressure is converted into a light signal and transmitted to an electric circuit provided in the car room. Therefore the engine room can be kept totally free of any electric detecting circuit. This is quite different from conventional apparatus which requires an electric circuit to detect vortexes in the engine room and to transmit electric signals. Thus the effects of ambient temperature increases and the influence of electrical noise are minimized. In this respect the car room does not have such severe temperature fluctuations compared as the engine room. Therefore, the electric circuit configuration can be simplified, the cost is lowered, and a high reliability is obtained, resulting in a remarkable improvement in operation.

It goes without saying that what has been described above can be applied extensively to engines other than automobile engines.

In addition to the vortex detecting unit for Karman's vortex flow metering apparatus which has been described above, the invention can also be utilized as a microscopic differential pressure switching element, a flow detector, etc.

We claim:

1. In a Karman's vortex flow metering apparatus provided with a columnar vortex generator mounted in a measuring line for generating Karman's vortexes alternately near its opposite sides in a fluid flowing in said line, a vortex detector provided outside the measuring line and including an oscillating member oscillated by pressures of said vortexes generated alternately, wherein said vortex generator has vortex generating slits extending along the opposite sides almost orthogonal to the flow of fluid in the measuring line and also has vortex pressure detecting slits on both sides of the generator column in the downstream direction from the vortex generating slits, and wherein the vortex detector has pressure transmitting holes connected through to said vortex pressure detecting slits for transmitting pressures of the vortexes generated alternately by said vortex generator to apply them to said oscillating member.

2. A Karman's vortex flow metering apparatus, comprising:
   a Karman's vortex generator which is inserted in a flow of fluid;
   a plate member made of a magnetic material;
   means for magnetically supporting at least a portion of said plate member;
   means for communicating fluid pressure fluctuations arising near the Karman's vortex generator to said plate member, so that said plate member vibrates at a frequency proportional to the fluid flowrate;
   means for detecting the vibration frequency of said plate member; and
   means for indicating a value proportional to said vibration frequency, as a value proportional to the fluid flowrate.

3. The Karman's vortex flow metering apparatus as defined in claim 2, wherein a displacement detecting means to detect a displacement of said plate member optically is provided.

4. The Karman's vortex flow metering apparatus as defined in claim 2, wherein a displacement detecting means to detect a displacement of said plate member magnetically is provided.

5. A Karman's vortex flow metering apparatus, comprising:
   a Karman's vortex generator which is inserted in a flow of a fluid;
   a fluid chamber having a generally isosceles triangle shaped cross-section and having two isosceles walls;
   a swing member supported at a pivot, placed generally at the vertex of said isosceles triangle;
   two inlet openings each of which are perforated in different isosceles walls of the fluid chamber at positions such that each inlet opening is covered by the swing member body when the swing member contacts the isosceles wall surface having that inlet opening;
   pressure lead holes respectively connected with said inlet openings of the fluid chamber, for receiving fluid pressure fluctuations arising near the body of the vortex generator, so that said swing member will swing in response to said pressure fluctuations and at a frequency proportional to the fluid flowrate;
   means for detecting the swing frequency of said swing member; and
   means for indicating a value proportional to said swing frequency, as a value proportional to the fluid flowrate.

* * * * *